US009262742B2

(12) United States Patent
Moonka et al.

(10) Patent No.: US 9,262,742 B2
(45) Date of Patent: Feb. 16, 2016

(54) USER LIST IDENTIFICATION

(75) Inventors: Rajas Moonka, San Ramon, CA (US); Anurag Agarwal, Sunnyvale, CA (US); Oren E. Zamir, Los Altos, CA (US)

(73) Assignee: Google Inc., Mountain View, CA (US)

( * ) Notice: Subject to any disclaimer, the term of this patent is extended or adjusted under 35 U.S.C. 154(b) by 777 days.

(21) Appl. No.: 13/221,262

(22) Filed: Aug. 30, 2011

(65) Prior Publication Data

US 2012/0054189 A1 Mar. 1, 2012

Related U.S. Application Data

(60) Provisional application No. 61/379,287, filed on Sep. 1, 2010.

(51) Int. Cl.
*G06F 7/00* (2006.01)
*G06F 17/30* (2006.01)
*G06Q 10/10* (2012.01)
*G06Q 30/02* (2012.01)

(52) U.S. Cl.
CPC ............... *G06Q 10/10* (2013.01); *G06Q 30/02* (2013.01)

(58) Field of Classification Search
None
See application file for complete search history.

(56) References Cited

U.S. PATENT DOCUMENTS

| | | | | |
|---|---|---|---|---|
| 5,948,061 | A * | 9/1999 | Merriman et al. | 709/219 |
| 6,701,362 | B1 * | 3/2004 | Subramonian et al. | 709/224 |
| 7,997,485 | B2 * | 8/2011 | Flake et al. | 235/383 |
| 2006/0224624 | A1 * | 10/2006 | Korn et al. | 707/104.1 |
| 2007/0266076 | A1 | 11/2007 | Cox et al. | |
| 2009/0125377 | A1 * | 5/2009 | Somji et al. | 705/10 |
| 2009/0187939 | A1 * | 7/2009 | Lajoie | 725/34 |
| 2009/0247193 | A1 * | 10/2009 | Kalavade | 455/456.3 |
| 2009/0248680 | A1 * | 10/2009 | Kalavade | 707/5 |
| 2010/0042507 | A1 | 2/2010 | Pritchard et al. | |
| 2010/0153516 | A1 * | 6/2010 | Weinberg et al. | 709/217 |
| 2010/0211960 | A1 * | 8/2010 | Sirajuddin et al. | 719/313 |
| 2010/0325113 | A1 * | 12/2010 | Valeski | 707/740 |
| 2011/0191142 | A1 * | 8/2011 | Huang et al. | 705/7.33 |
| 2011/0314048 | A1 * | 12/2011 | Ickman et al. | 707/769 |

FOREIGN PATENT DOCUMENTS

| | | |
|---|---|---|
| KR | 10-2005-0116254 | 12/2005 |
| KR | 10-2009-0081579 | 7/2009 |
| KR | 10-2010-0069424 | 6/2010 |

OTHER PUBLICATIONS

Authorized officer Mi Jeong Park, International Search Report and Written Opinion in PCT/US2011/049780, mailed May 1, 2012, 9 pages.

(Continued)

*Primary Examiner* — Kimberly Wilson
*Assistant Examiner* — Michael Pham
(74) *Attorney, Agent, or Firm* — Fish & Richardson P.C.

(57) ABSTRACT

Systems, methods, computer program products are provided for presenting content. An example computer implemented method includes identifying, by a data exchange engine executing on one or more processors, one or more user lists based on owned or permissioned data, each user list including a unique identifier; associating metadata with each user list including data describing a category for the user list, population data describing statistical or inferred data concerning a list or members in a given user list and subscription data including data concerning use of a given user list; storing in a searchable database a user list identifier and the associated metadata; and publishing for potential subscribers a list of the user lists including providing an interface that includes for each user list the unique identifier and the associated metadata.

28 Claims, 14 Drawing Sheets

(56) References Cited

OTHER PUBLICATIONS

Authorized officer Nora Lindner, International Preliminary Report on Patentability in PCT/US2011/049780, mailed Mar. 14, 2013, 6 pages.

Chang, F., et al. (2006). "Bigtable: A Distributed Storage System for Structured Data," OSDI '06: Seventh USENIX Symposium on Operating System Design and Implementation, pp. 205-218.

Office Action issued in Australian Application No. 2011296096 on Oct. 16, 2015, 3 pages.

\* cited by examiner

Recommended segments

Provided by User5 — 182
International business travelers ★★★★☆    $4.75 CPM    [Buy this segment]   _180_
Based on this segment: Business travelers / $0.15 CPM / User5 — 188    184    Dismiss — 185

Provided by User7
In-market traveler to Western Europe   Not yet rated    $2.5 CPM    [Buy this segment]   _186_
Added this month, based on category: travel    190    Dismiss ⊕ Filters — 174
Quick filters based on your current 8 segments — 172
4.5 to 5 star reviews (58)    better coverage (11)    comparable, lower-cost alternatives (2)
Category includes "travel", CPM <= $5    comparable, better quality (26)    income (42) — 176

(Choose Columns) — 170

387 Available Segments — _152_

| Name — 154 | Provider — 166 | CPM (USD) — 156 | Category — 158 | Average review — 160 | Users — 164 |
|---|---|---|---|---|---|
| Adventure travel in-market | User5 | 2.25 | travel | ★★★★☆ | 184K |
| Airline credit card holders | User4 | 2.3 | financial, travel | ★★★★★ | 321K |
| Asian business travelers | User3 | 4.975 | travel | ★★★★☆ | 363K |
| Frequent flyers – big revenues | User5 | 4.5 | travel | ★★★★★ | 421K |
| Frequent flyers – low revenue | User5 | 4.75 | travel | ★★★☆☆ | 222K |
| International business travelers | User5 | | | ★★★★☆ | 130K |
| In-market for luggage | User2 | 3.365 | accessories, travel | ★★★★★ | 6K |
| In-market for luxury goods | User5 | 2.95 | luxury, travel | ★★★★☆ | 30K |

Audience Segments

[ New Segment ] *604*
Export Segments

Recommended segments  Show all  *606*

| | | |
|---|---|---|
| In-market Hawaii vacationers | ★★★★☆ | $5.50 CPM User1 |
| Leisure frequent flyers | ★★★☆☆ | $4.75 CPM User2 |
| Oneworld elite frequent flyers | ★★★★★ | $4 CPM User1 |
| Star alliance Gold elite frequent flyers | ★★★★☆ | $5 CPM User1 |

[ Choose Columns ]

8 audience segments Data as of May 25, 2010

⊕ Filters
Showing active segments only

*602*

| Name | Rating | Users | Page views | Recency | Membership expiration |
|---|---|---|---|---|---|
| adventure travelers | | 154K | 2 | 4 days | 4 days |
| Business travelers $5.15 CPM User3 | ★★★★☆ | 320K | 1 | 1 day | 3 days |
| Deal hunters | | 98.3K | 1 | 2 weeks | 2 weeks |
| Frequent flyers | | 400K | 2 | 1 day | 1 day |
| Leisure travelers | | 232K | 1 | 3 days | 3 days |
| Mattress crammers | | 129K | 2 | 1 day | 3 days |
| Mileage runners $2 CPM User1 | ★★★★☆ | 267K | 4 | 1 day | 1 day |
| Trolls | | 32K | 1 | 3 days | 3 days |

FIG. 6

USER LIST IDENTIFICATION

CROSS-REFERENCE TO RELATED APPLICATION

This application claims priority to U.S. Provisional Application No. 61/379,287, filed on Sep. 1, 2010. The disclosure of the prior application is considered part of and is incorporated by reference in the disclosure of this application.

TECHNICAL FIELD

This document relates to presenting content.

BACKGROUND

Providing relevant advertising content to users is generally important to advertisers and service providers. However, implementing a cost-effective way of providing such relevant advertising content can prove difficult in an ever-changing online market. Further, while relevant information for targeting a particular user may be known by one entity, others may not readily have access to or be able to use such information when, for example, making targeting decisions.

SUMMARY

This document discusses systems and techniques for presenting content. An example computer implemented method includes identifying, by a data exchange engine executing on one or more processors, one or more user lists based on owned or permissioned data, each user list including a unique identifier; associating metadata with each user list including data describing a category for the user list, population data describing statistical or inferred data concerning a list or members in a given user list and subscription data including data concerning use of a given user list; storing in a searchable database a user list identifier and the associated metadata; and publishing for potential subscribers a list of the user lists including providing an interface that includes for each user list the unique identifier and the associated metadata.

Aspects of the method can include one or more of the following features. The population data can include qualification data describing qualifications for members to be included in a user list. The subscription data can include cost information for subscribing to a user list. The subscription data can include restrictions on use of the user list including restrictions on joining the user list data with other data. The metadata can include data developed by a non-owner of a respective user list relating to cross correlations between members included in a user list. The metadata can include data developed by a non-owner of the user list data relating to inferences about members included in a user list. The developed data can include correlations developed from analyzing data known by the non-owner of members in a given user list. The developed data can be demographic data or inference information developed from data related to members in a given user list and that is known by the non-owner, and wherein the developed data is inferred from data selected from the group comprising similar web sites visited, videos viewed, types of searches conducted, determined related interest categories, determined geographical distribution, and calculated score for a probability to purchase goods or services.

Storing can include indexing the metadata for ease of retrieval based on received queries. The population data can include size of the user list in terms of members, age of data in a user list, recency of updates to a user list, a rating for a user list, a popularity rating for the user list, a number of page views required by members to qualify for membership in a user list, or likely page views for a given member of a user list on a given slice of inventory. The subscription data can include best practices for use of the user list data.

The method can include receiving a query including one or more query terms that describe an audience that a consumer is attempting to target; searching the database for matching user lists based on the query terms; and presenting matching user lists responsive to the query. The received query can include a user list the consumer is currently subscribed to. The received query can include a user list, and the method can include determining user lists similar to the user list included in the received query. The received query can include a set of websites/pages that are of interest to the consumer, a set of video channels or categories that are of interest to the consumer or a set of keywords describing an audience the consumer is seeking to target. The received query can include use data describing an intended use of data in subscribed user list and the method can include providing user lists that include subscription restrictions that match allow the use.

Searching the database for matching user lists based on the query terms can include using past and current subscription information associated with a consumer that provided the query to filter matching user lists and provide personalized results in response to the query. The method can include evaluating one or more criteria to determine a candidate user list for presentation to a consumer; and presenting candidate user lists as a recommendation to a consumer. The one or more criteria can be based on terms provided by a consumer that describe an audience of interest that the consumer is attempting to target, on historical use of user list data by a respective consumer or on similarities between two or more user lists. The recommendation can be based at least in part on a consumer's vertical, demographic information provided by the consumer, concepts provided as part of an advertising campaign planning operation, web site suggestions made by a consumer or search queries provided by a consumer.

The details of one or more embodiments are set forth in the accompanying drawings and the description below. Other features and advantages will be apparent from the description and drawings, and from the claims.

DESCRIPTION OF DRAWINGS

FIGS. 1B-H are example user interfaces associated with the system of FIG. 1A.

FIG. 6 is an example user interface displaying a current subscription of user lists.

Like reference symbols in the various drawings indicate like elements.

DETAILED DESCRIPTION

Advertisers, publishers, and service providers generally may wish to exchange data for purposes of implementing a meaningful way of providing information and/or services (e.g., advertising content) to online users. If specific content is determined to be meaningful to a particular user, then the user may wish to access the content, purchase the content, or otherwise interact with the content. This interaction can provide revenue to the content provider (e.g., advertiser, publisher or service provider). If a particular content provider (e.g., advertiser, publisher, or service provider) can collect data about how specific content may or may not be meaningful to users (i.e., in the form of a user list), the collected data may be used by others in a variety of ways. One use relates to selecting targeted content. Other uses are possible, such as in adjusting bids in an auction based, for example, on user lists that indicate specific content is of interest to one or more users. User lists can be published, sold, licensed or otherwise accessed to assist in providing personalized content to the specific users and increasing revenue for a content provider.

User lists can represent specific user information pertaining to predefined categories. The categories can be defined by the data owners. For example, a user list may include data about one or more users which characterizes the users to a category (e.g., homeowner, craftsman, DVD renter, etc.) to allow targeting of the users by, for example, publishers or advertisers. In some implementations, the user lists can be used to target relevant advertising content.

User lists can be generated and exchanged according to a number of rules, and those rules can be used to market particular user lists to specific consumers. The rules can employ methods of assigning users to particular user lists. Such rules can provide a logical categorization of data, information, or services for the purposes of determining which data content in the user lists is particularly relevant to a number of users.

Methods are described for associating user specific information with one or more user lists that are owned or maintained by a data owner. The user lists can be published, in for example, an exchange. Data about the users lists can be provided to allow potential subscribers to evaluate a given user list, as against others or the needs of the given consumer.

Figure 1A:
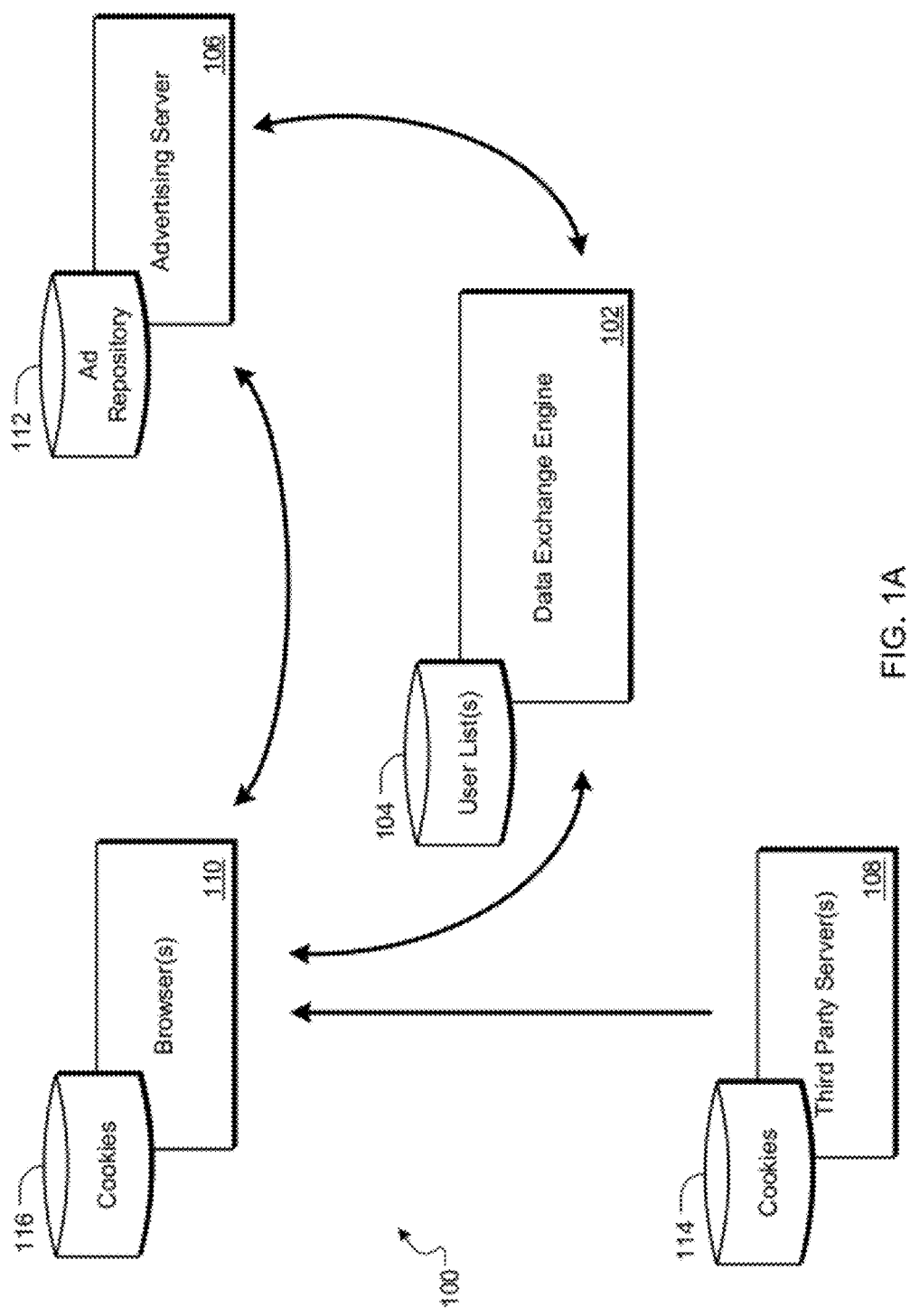
FIG. 1A is a schematic diagram of an example system for providing and using shared data.

FIG. 1A is a schematic diagram of a system 100 for providing and using shared data. The shared data can, for example, include user lists detailing a number of predefined categories pertaining to specific users. The categories can be defined by or relate to user information including, but not limited to, browser history, user selections, cookie information, user-provided preferences, purchase histories, web search data, or other data (i.e., where the user has provided permission for the storing and/or collecting of such data). In some implementations, a user list is owned by a data provider that gathered the information in a respective user list. In some implementations, the user lists can be shared with other entities, such as for example using a data exchange. For example, the user lists can be shared amongst advertisers, third-party service providers, or third-party advertisers, data aggregators, and other online users.

The user lists can be provided to the data exchange and maintained by the data exchange and/or by the data owners. User lists can be updated as appropriate to either refine the category/categories associated therewith or the users that are members of a given list. Management of user lists is described in greater detail below.

The system 100 includes a data exchange engine 102 for providing an interface for consumers (e.g., advertisers) and others to discover and/or license user lists 104. FIG. 1B shows an example user interface 150 for a marketplace for presenting user lists (also referred to therein as "segments" or "audience segments"). The presented user lists can be all available, all that correspond to one or more filter criteria, those surfaced based on prior use or data provided from a potential consumer or other filter criteria. FIG. 1B and presentation of user lists to potential subscribers is described in more detail below (e.g., see FIGS. 3 to 6).

Figure 1C:
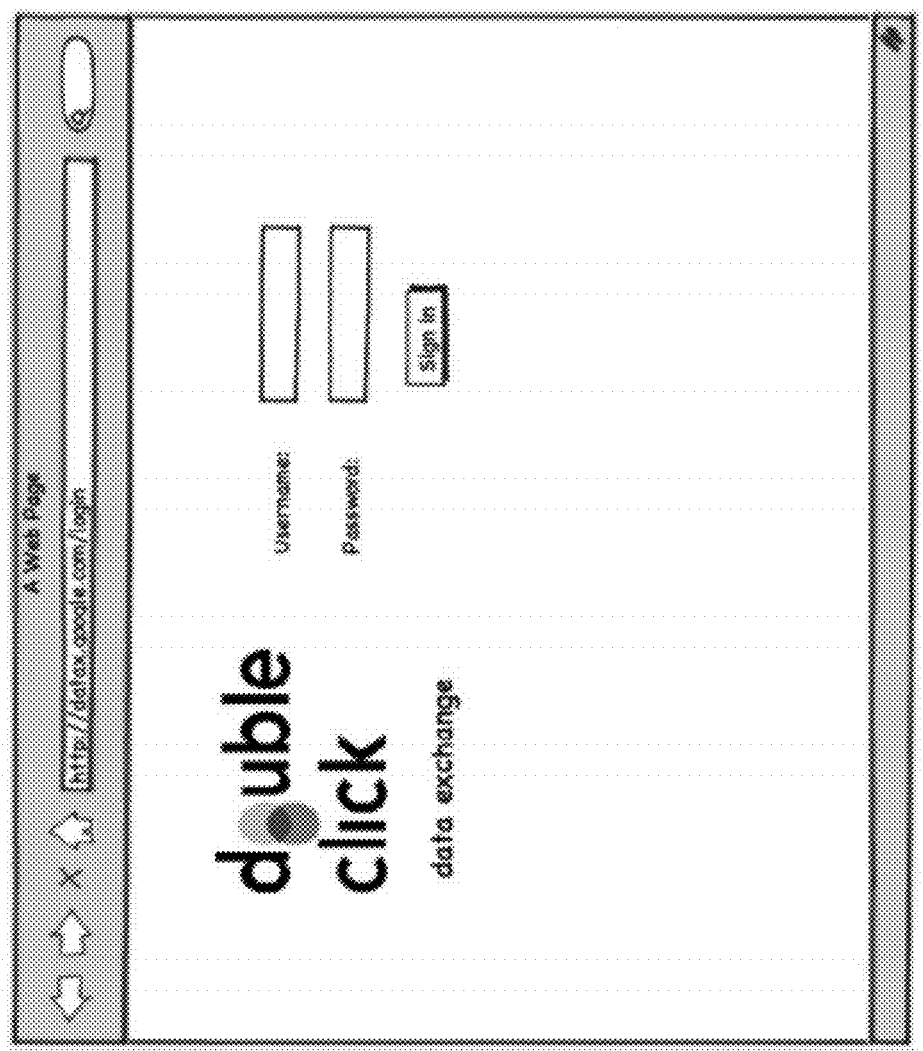
Figure 1D:
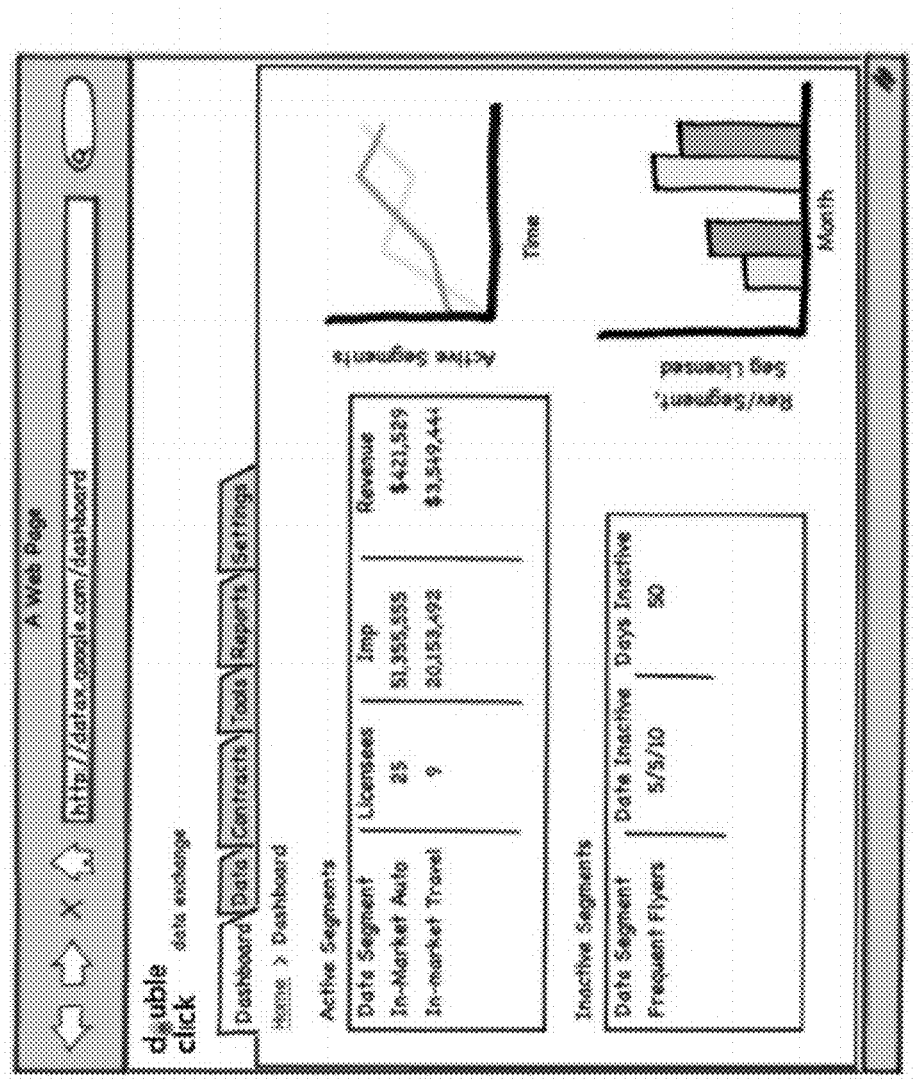
Figure 1E:
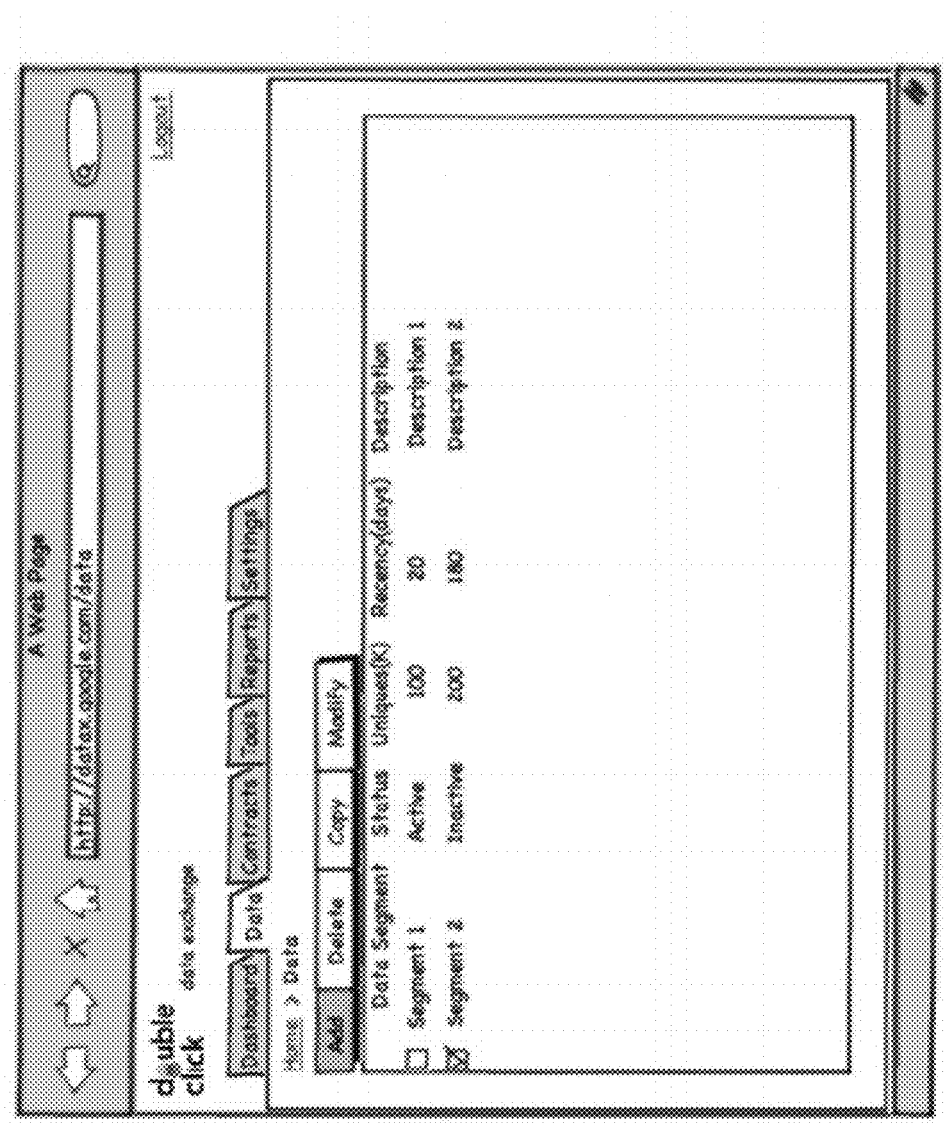
Figure 1F:
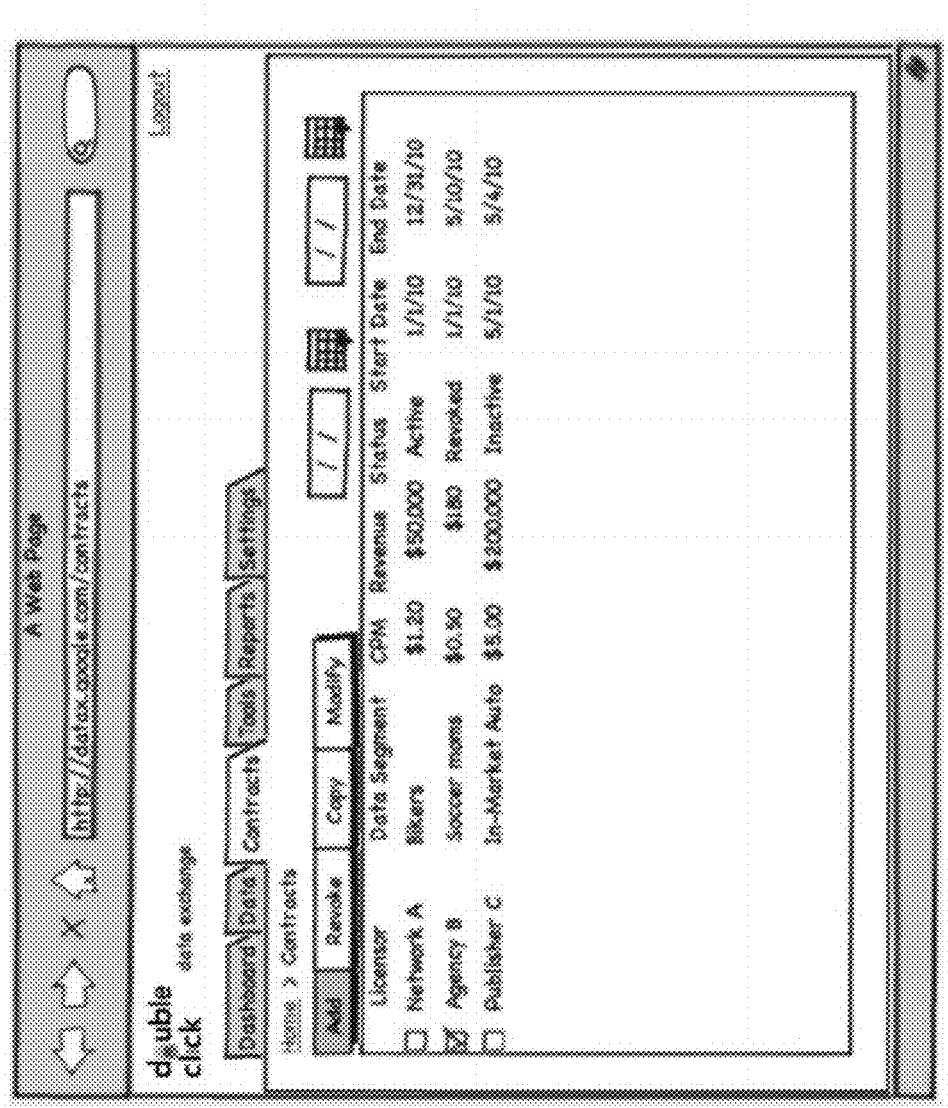
Figure 1G:
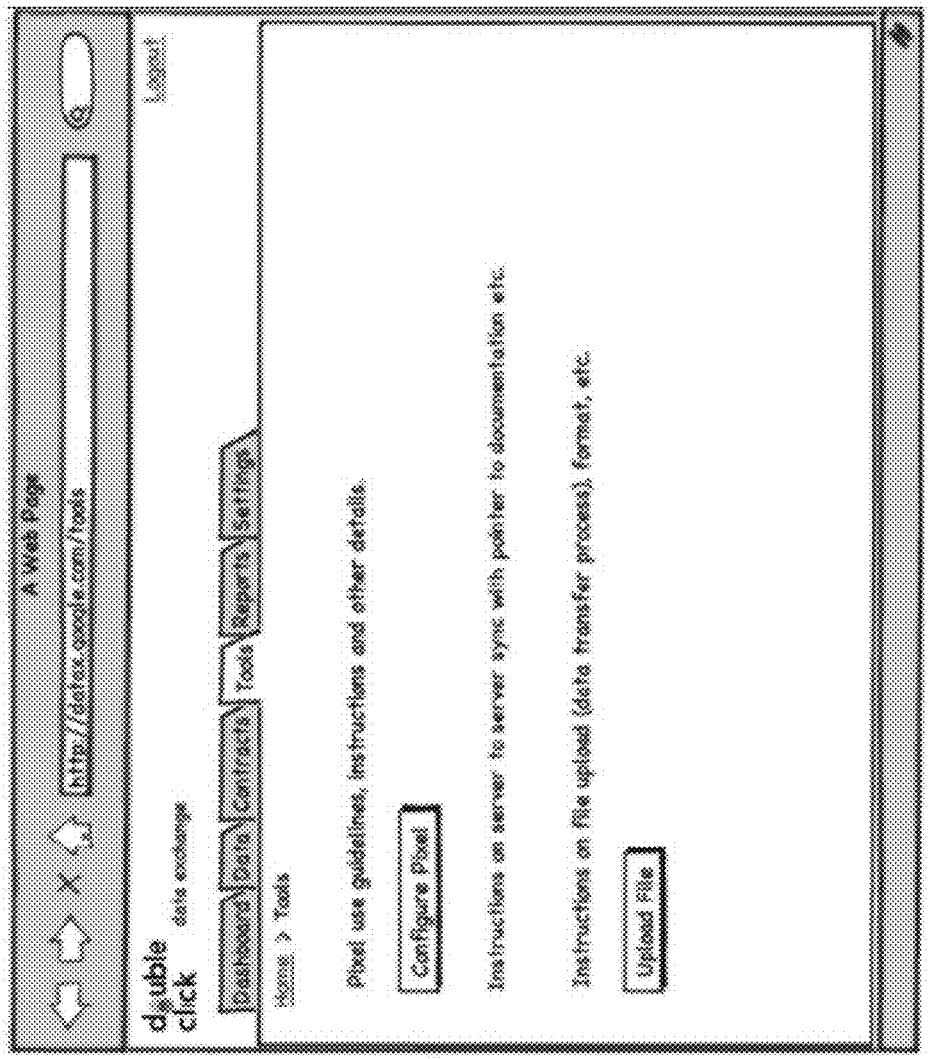
Figure 1H:
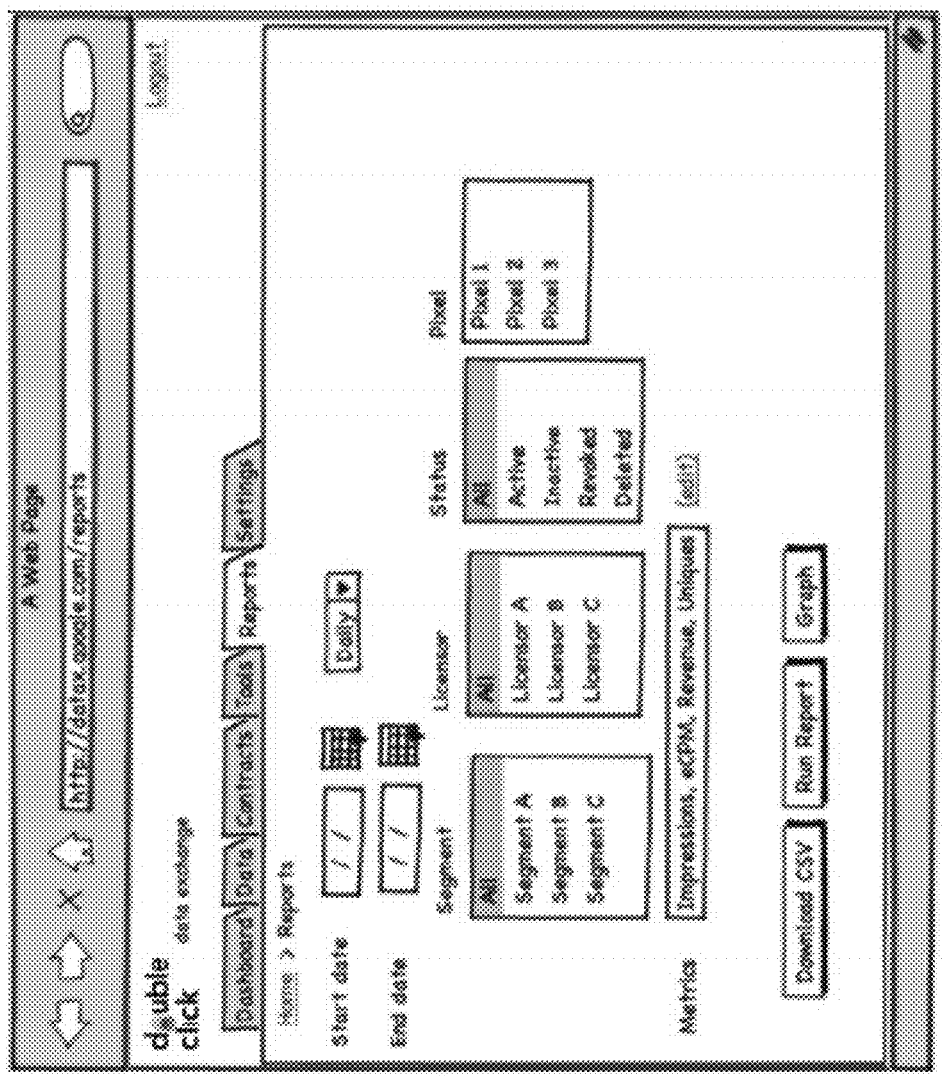

FIGS. 1C-H show example user interfaces for managing user list subscriptions. FIG. 1C shows a login page for accessing user lists associated with a subscriber account in the marketplace shown in FIG. 1B. FIG. 1D shows an example user interface that includes active and inactive segments associated with a subscriber account. FIG. 1E shows an example of a user interface for managing segments. FIG. 1F shows an example of a user interface showing contract details for subscriptions. FIG. 1G shows an example of a user interface showing tools available for managing a subscription. FIG. 1H shows an example of a user interface for reports associated with a subscription account. The data exchange engine 102 can be configurable to maintain, update, present, license, sell or otherwise manage one or more user lists based on owned or permissioned data. The generated user lists can include user-specific associations characterizing specific online user behavior. The associations can be used, for example, to provide personalized content from an advertising server 106, a third-party server 108, or other content provider. The data exchange engine 102 as described here may parallel the functionality of an online advertisement exchange system for active targeted online advertisers, for example.

In some implementations, the data exchange engine 102 can create an exchange between owners of permissioned data and users of such data. Users of the permissioned data can include advertisers that seek to target particular categories of users. In some implementations, the data exchange engine 102 provides a mechanism for a provider of advertising placement services in targeted online advertising to make available additional third-party data sources to buyers of advertising space. In some implementations, the data exchange engine 102 can provide user lists to publishers, syndicates, and other data providers for various purposes, including the targeting of advertising content to users.

The data exchange engine 102 can provide an interface for data owners to securely view and manage their own data (i.e., manage a user list). For example, a data owner can generate and store information in a user list by entering data both manually and automatically. Other entities may be permitted to enter/maintain information in a user list. Publishers can also extract data for direct sales models or other marketing plans. Although computer hardware is not depicted in the data exchange engine 102, processors, memory, and other processing components may be included.

The advertising server 106 can provide advertising content to any number of browsers 110 via the data exchange engine 102 or directly. In addition, the advertising server 106 can be configurable for receiving advertising content requests and providing advertising content to requesting users. In operation, the advertising server 106 can select advertisements targeted based on one or more criteria and in view of data that is included in one or more user lists. The advertising server 106 can also provide access to other storage elements, such as ad repositories, in the example shown as ad repository 112. The ad repository 112 can be used to store advertising content associated with particular keywords, bidding criteria, advertisers, and targeting criteria. Data storage elements may include any one or combination of methods for storing data, including without limitation, arrays, hash tables, lists, and pairs. The advertising server 106 can access other similar types of data storage devices, such as user lists 104, for example.

In some implementations, advertisers can work with data providers to purchase or license user lists for purposes of targeting certain categories (e.g., demographic categories, interest categories, preference categories). The user lists can be analyzed for quality and other considerations. The advertisers can use the user lists for determining targeting criteria or to modify current bids, for example. In one example use case, an advertiser can subscribe for a period of time to a user list. The user list itself may be defined as being associated with a certain category (e.g., Internet shoppers interested in buying a sports car) of users. Requests for advertisements can be received by the advertising system, and the data exchange can be used to determine for a given user to which user lists the user is subscribed. In a real-time bid example, the advertisers that have subscribed to the user lists may be presented with the request (and necessarily information that the users satisfy the category(ies) associated with the user list(s)), and then may adjust/submit bids in consideration of such information. This is just one example of a use for the user list data.

The third-party servers 108 can provide third-party services to any number of browsers 110 via the data exchange engine 102. For example, the third-party servers 108 can provide web services, advertising services, or external APIs (application programming interfaces) to connect to a third-party server. The third-party servers 108 can include, for example, one or more servers executing a search engine application program. In some implementations, the third-party servers 108 can include a related information server or an advertising server. Third-party servers 108 can track user activity using, for example, cookies 114.

The browser 110 represents a user browsing the Internet. The browser 110 can access any website available on a network belonging to a person, or any other type of entity such as a company, enterprise, etc. For example, in FIG. 1 browser 110 can access a service or website. The service or website can be hosted by the third-party server 108, or alternatively by another server associated with system 100. A user can employ the browser 110 to search the Internet for services, information, or merchandise. The browser 110 can track user activity using cookies 116.

In some implementations, the advertising server 106 includes one or more advertisement customizers (not shown) operable to customize advertising content according to one or more user lists. In particular, an advertisement customizer can customize the display criteria, language, or other content of an advertisement according to user list information. For example, if a particular user list includes user-entered searching pertaining to purchasing a vehicle, the advertising server 106 can use the user-entered searching information (e.g., a cookie stored from performing a web search in a browser) to customize the display or content of an advertisement. The customization can, for example, provide the user with a more relevant advertisement.

In operation and for each generated user list, the system 100 can store, for example in a table-based repository, a list of user lists for which a particular user belongs. The table-based repository can, for example, be represented by a proprietary distributed storage system having a multi-dimensional sorted map as described in the paper entitled "Bigtable: A Distributed Storage System for Structured Data" by Fay Chang, Jeffrey Dean, Sanjay Ghemawat, Wilson C. Hsieh, Deborah A. Wallach, Mike Burrows, Tushar Chandra, Andrew Fikes, and Robert E. Gruber, the content of which is incorporated herein by reference in its entirety. The table-based repository represents a distributed storage system for managing structured data that is designed to scale to a very large size (e.g., petabytes of data across thousands of commodity servers).

Each user list in the proprietary database can be included in one or more tables having multiple dimensions (one of which may be a field for time, allowing for versioning and garbage collection).

The system 100 can provide an index to the table-based repository. The index can be represented by, for example, a user cookie. For example, the table-based repository may be a set of rows and columns where the rows represent cookies corresponding to particular users and the columns represent a characterization associated with the user list, such as particular categories, keywords, websites, or other descriptive data.

At some point, the user browser 110 can make a request for advertising content from the advertising server 106 or the third-party server 108. The data exchange engine 102 can retrieve a list of user lists from the table-based repository associated with a received request and append or otherwise associate the list of user lists to the request. Any subsequent processing of the request can use the list, for example, for targeting, advertising customization and bid generation. The list of user lists or portions of the list can also be transmitted to a real-time bidder to provide the bidder with pertinent information about one or more users. Other uses are possible.

Figure 2:
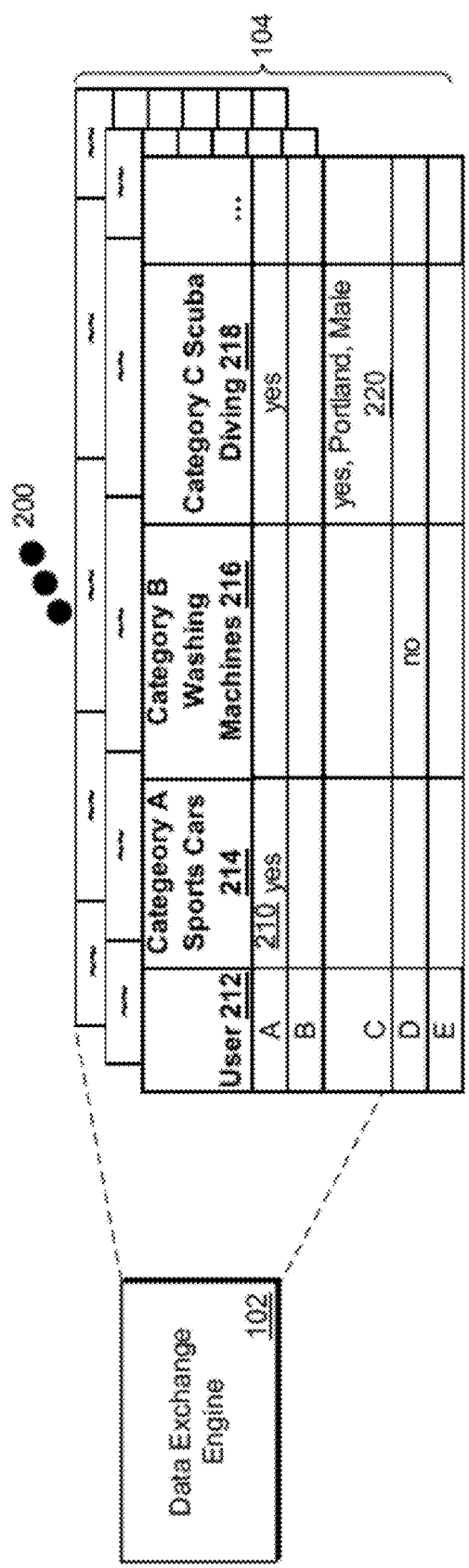
FIG. 2 is a schematic diagram of example user lists.

FIG. 2 is a schematic diagram of user lists 104 stored in a table 200. In this example, one or more entities (e.g., a web publishing entity that collected the user data) provided the user lists 104 to the data exchange engine 102. In some implementations, the user lists 104 in the table 200 are all provided by a same entity. Alternatively, the user lists 104 in the table 200 can include user lists owned/associated with different entities. In some implementations, entities can create their own user lists and provide the lists to the data exchange engine 102. For example, entities can format content in user lists according to preferences associated with users and offer the user list data to the data exchange engine 102 for publication, management and use in targeting content to the users. The data in the user lists 104 is developed, for example, based at least in part on user-provided, searching and browser data or other user provided data. In this example, the data exchange engine 102 can manage the user lists 104 which details users 212 A-E.

In this example, each row represents a single user. A user identifier (not shown) can be used to identify a user. The user identifier can be a user identifier associated with a user in a domain associated with the entity that owns/provides the data (i.e., a local identifier). In some implementations, such as those where plural different entities provide user lists that are stored in a single table, the user identifier can be of the form of a global identifier associated with the user, such as an identifier that the advertising system assigns to the user. Global identifiers can be associated with "local" entity identifiers and mapped such that requests that include a local entity identifier can be associated with the global identifier and hence, can be associated with user lists associated with plural entities. Other techniques can be used to identify users, such as cookie-matching technology to allow for the mapping of local identifiers to global identifiers.

Each column represents a user list that includes a characterization (sometimes referred to as a definition), such as by way of a particular category(ies), keyword(s), website(s), demographic(s), interest(s), or other user classification. Example characterizations in the table 200 include sports cars, washing machines, and scuba diving. The characterization can include descriptors, such as keywords, that describe a given category. Each characterization may embody the combination of plural separate categories or subject matter. For example, the characterization sports cars, may embody those individuals that visited a web site that were interested in cars and those that were particularly interested in sports cars (which themselves represent two different categories). In some implementations, logical combinations of categories or subject matter can be used to define the characterization for a given user list.

In some implementations, each entry in the table (i.e., the intersection of a row and a column) represents whether the user is a member of a given list. For example, entry 210 indicates that user A is interested in or associated with a user list that has the characterization of sports cars. In some implementations, other data may be included in the entry. Other data can include geo-location data, cookie data, further personal data related to the user and known by the data owner, example web pages or example content (i.e., content surfed by the user), keyword searches, location data, website data, side vertical data, page vertical data, formatted text strings (where the data owner may include data related to the particular user in accordance with a definition set by the data owner (e.g., a series of bits that are set or not depending on the individual user's data for things like demographics, other interests, or other data that is different from the characterization but may be of use in targeting information to the particular user)) or other data. For example, entry 220 includes an indication that user C is not only a member of the user list associated with category C (scuba diving) but also that the user is located at a particular location (e.g., lives in Portland) and is a member of certain demographic groups (e.g., is male). Other information can be included so as to provide more relevant available information to potential consumers of a given list.

Identification of user lists to which a person belongs can be made by the data exchange engine 102 when a cookie or other user identifiable information is received. In some implementations, the data exchange engine 102 uses the cookie or user identifying information as an index to the user lists 104. For example, the data exchange engine 102 can cross reference received user identifier data with particular user list information to determine an association between user list data and the cookie data/user information. As shown in user lists 104, a user (A) showed an interest in user list A which is characterized by the keywords "sports cars". For example, the user may, as part of a session with a given data provider, have provided a request to view sports cars made by Lexus such as providing a keyword search for "Lexus sports cars."

Figure 3:
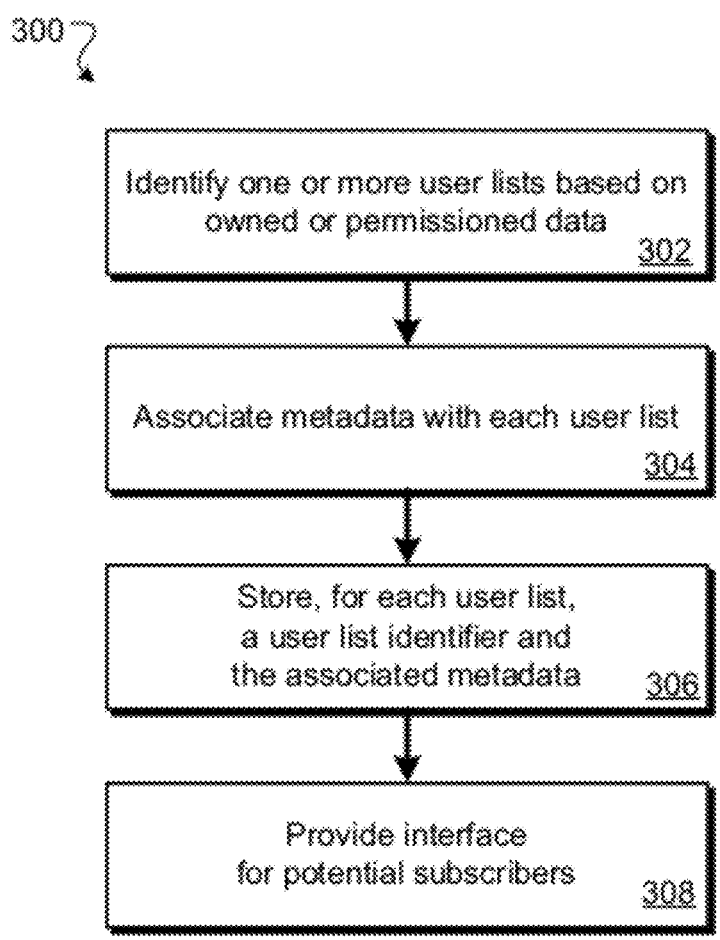
FIG. 3 is a flow diagram of an example process for publishing a list of user lists.

FIG. 3 is a flow diagram of an example process 300 for publishing a list of user lists including associated metadata. The process 300 may be executed, for example, by the data exchange engine 102 shown in FIG. 1A.

At stage 302, one or more user lists are identified based on owned or permissioned data. The user lists may be user lists 104 and may be provided by one or more entities to the data exchange engine 102. The user lists may be generated by the data exchange engine 102, such as from data provided from data owners or users. Each user list can include a user list identifier. The user list identifier can be determined, for example, by the data owner, or, for example, by another entity, such as the data exchange engine 102.

At stage 304, metadata is associated with each user list, including data describing one or more categories for a user list, population data describing statistical or inferred data concerning a list or members in a given user list, and subscription data including data concerning use of a given user list. Metadata can be associated with a user list, for example, by a data owner. As another example and as described in more detail below, metadata can be associated with a user list by a non-owner of the user list.

The data describing a category for a user list can be, for example, a category name, such as "travel", "luxury goods", or "sports". A given user list can have multiple associated categories. For example, a given user list can have associated categories of "luxury" and "automobile".

Population data can include, for example, statistical or inferred data concerning a user list. For example, population data can include a date of creation of the user list. As another example, population data can include data concerning one or more ratings or reviews for a user list. For example, an average review score or a popularity rating can be associated with a user list. As another example, user review comments can be associated with a user list.

Population data can also include information describing a schema or format of the user list data. For example, population data can include information indicating a number of fields included in the user list data and a data type for each field. For fields of an enumerated type, population data can include indications of possible values allowed for the field. For fields of a numerical data type, population data can include minimum and maximum values allowed for the field.

Population data can include statistical or inferred data concerning members in a given user list. For example, population data for a given user list can include a count of the number of members in the user list, data indicating a recency of updates to the user list (e.g., date of last member addition, date of last member deletion), and other statistics regarding data concerning members in the user list. For example, for an enumerated field included in user list data, population data can include one or more statistics which indicate a distribution of values across user list members for the field. For a numerical field included in user list data, population data can include statistics such as minimum and maximum stored values, a mean value, or a median value. In some implementations, population data can also include one or more statistics indicating likely page views for a given member of a user list on a given slice of inventory.

Population data can include qualification data describing qualifications for members to be included in a user list. For example, qualification data can include a number of page views required by a member to qualify for membership in a user list. As another example, qualification data can include criteria indicating a set of sites to be visited by a member or one or more types of sites to be visited by a member for a member to qualify for inclusion in a user list. As yet another example, qualification data can include one or more search keywords to be entered by a member for a member to qualify for inclusion in a user list. Qualification data can also indicate criteria for a member to be excluded, or "dropped" from a user list. For example, a criterion can specify that a member is removed from a given user list if they do not enter any search keywords associated with the user list during a given time period (e.g., two weeks).

As mentioned, metadata for a user list can include, in addition to population data, subscription data including data concerning use of a given user list. For example, subscription data can include cost information for subscribing to a user list. In some implementations, cost information can be described in terms of a cost per one thousand impressions (CPM). That is, cost information can indicate a cost for using a user list to generate one thousand impressions.

Subscription data can also include restrictions on use of the user list. For example, a data owner can indicate that user list data for a given user list may not be combined with other data, or that the user list data may not be combined with certain types of other data (e.g., competitor data, or data having a particular subject matter or of a particular category). A data owner can specify that user list data is applicable to or restricted to use associated with a particular geographic region. Subscription data can indicate whether use restrictions are negotiable or non-negotiable.

Subscription data can also include descriptions of best practices for use of a user list. For example, subscription data can include descriptions of particular uses of user list data that have been demonstrated, through testing, to be effective. As a more particular example, subscription data can include descriptions of other types of data that have been effective when combined with given user list data.

As mentioned, metadata associated with a user list can include data developed by a non-owner of the user list. For example, the developed data can include data relating to cross correlations between members included in the user list. For example, in reference to FIG. 1, the data exchange engine 102 (or the advertising server 106) can develop correlations by analyzing data known by the data exchange engine 102 about members in a given user list owned by a data owner. The data exchange engine 102 can perform analysis if given permission by the data owner.

Developed data can also include data relating to inferences about members included in a user list. For example, in some implementations, the data exchange engine 102 can infer data about members included in a user list, such as demographic data (e.g., geographical distribution), data about sites visited, data indicating videos viewed by members in a user list, types of searches conducted by members in the user list, determined related interest categories of members in the user list, and other data or statistics about members in a user list, such as calculated scores each indicating a probability that a given member is interested in purchasing goods or services.

At stage 306, a user list identifier and the associated metadata is stored in a searchable database. Storing can include indexing the metadata for ease of retrieval based on received queries. Storing can be performed, for example, by the data exchange engine 102.

At stage 308, a list of the user lists is published for potential subscribers. For example, publishing can include providing an interface that includes, for each user list, the unique identifier and the associated metadata. As a more particular example, the user interface 150 illustrated in FIG. 1B can be presented to potential subscribers. The user interface 150 includes an available user lists area 152 for presenting information about user lists to which potential subscribers can subscribe. As mentioned, user lists may be referred to (such as shown on FIG. 1B) as "segments" or "audience segments".

In the example shown, for each available user list, a user list name 154, a provider 156 (e.g., owner), a subscription cost 158 (e.g., in terms of CPM), one or more categories 160, an average review 162, and a user count 164 can be displayed. For example, an available user list 166 has a name of "Adventure travel in-market", is provided by a provider named "User5", has a cost of 2.25 CPM, is included in the category "travel", has an average review of four out of five "stars", and has one hundred fifty four thousand users.

The user interface 150 includes a filters area 170 which a subscriber can use to filter the user lists displayed in the available user lists area 150 to show user lists matching one or more criteria. For example, criteria 172 specifies to show user lists for which a category includes "travel" and for which a subscription cost is less than or equal to five dollars per one thousand impressions. The subscriber can edit the criteria 172 or define new criteria by selecting a control 174 to display a filters interface. In some implementations, one or more "quick filters" may be displayed based on characteristics of a subscriber's currently subscribed-to user lists or other historical data (e.g., based on prior use, popularity or prior viewing history). For example, a quick-filter 176 may be selected to display available user lists that are comparable to one or more of a subscriber's currently subscribed-to user lists but at a lower subscription cost.

A subscriber may also search for available user lists. For example, a subscriber may search for available user lists using a search interface (not shown). Searching for user lists is described in more detail below with respect to FIG. 4.

Figure 4:
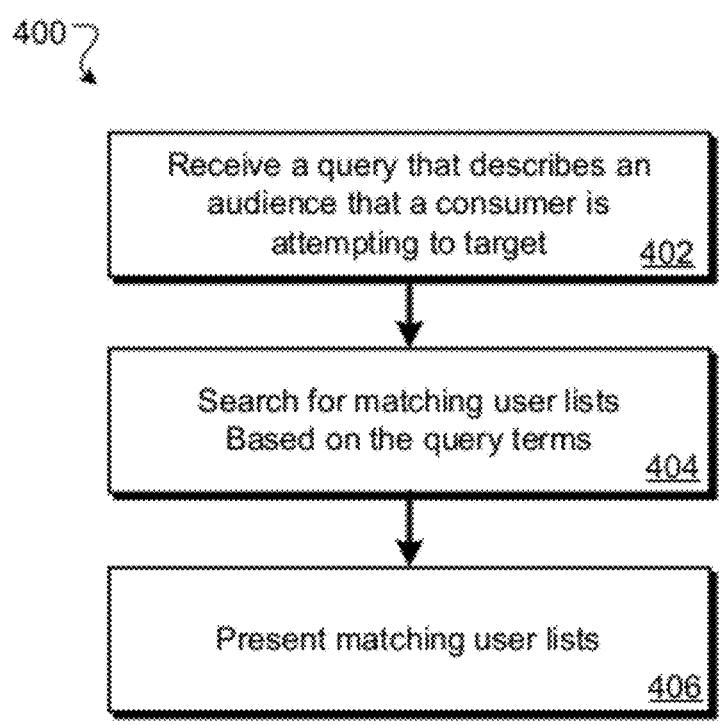
FIG. 4 is a flow diagram of an example process for searching for user lists.

FIG. 4 is a flow diagram of an example process 400 for searching for user lists. The process 400 may be executed, for example, by the data exchange engine 102 shown in FIG. 1A.

At stage 402, a query including one or more query terms that describes an audience that a consumer is attempting to target is received. The consumer can be, for example, a potential subscriber of a user list. The one or more query terms can be received, for example, from a user interface, such as from a filters interface (e.g., a filters interface displayed in response to selection of the control 174 shown on FIG. 1B), or from a search control displayed on a search interface. The one or more query terms can include one or more Boolean operators, such as AND, OR, or NOT.

The query terms can represent a set of keywords describing an audience the consumer is seeking to target. The received query terms can include or can be based on one or more user lists that the consumer is currently subscribed to. The received query terms can include or can be based on a set of websites, pages, video channels, or other content that is of interest to the consumer.

The query terms can also be based on one or more of a user list category, population data, subscription data, or on other metadata described above with respect to FIG. 3. The query terms can be based on demographics, such as defining age, gender, education level, income level, or geographic location criteria. The query terms can include or can be based on a description of an intended use of a user list.

At stage 404, a database is searched for matching user lists based on the query terms. For example, the data exchange engine 102 shown in FIG. 1 can search an indexed database which includes user list identifiers and associated user list metadata for user lists which match some or all of the query terms. If the query terms include use data describing an intended use of data in a subscribed user list, searching can include searching for user lists that include subscription restrictions that match the use. For example, a consumer can search for user lists for which a data owner allows the combining of the user list data with other data. If the query term includes or is based on one or more user lists that the consumer is currently subscribed to, searching can include determining user lists similar to the one or more user lists referenced in the query.

In some implementations, search results may be based on information that is known about the consumer (e.g., personalized search results may be identified). For example, search results may be based on a consumer's past behavior, existing or previously owned or licensed user lists, or on past and current user list subscription information.

At stage 406, matching user lists responsive to the query are presented. For example, matching user lists can be presented in a user interface such as in an interface similar to the available user lists area 152 shown in FIG. 1B.

Figure 5:
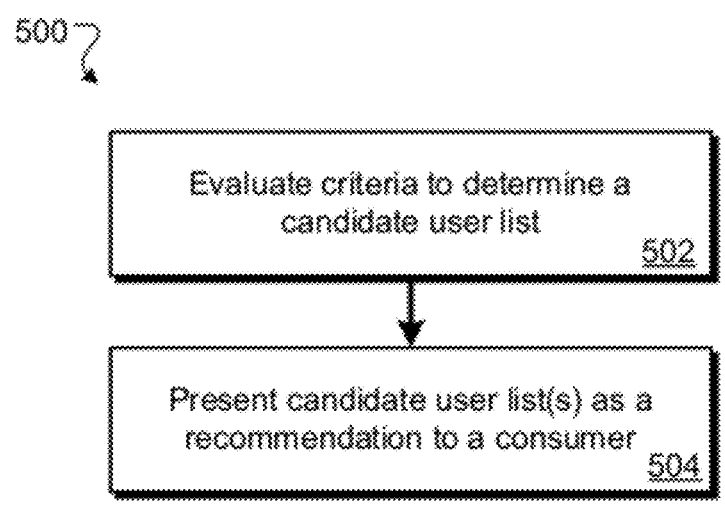
FIG. 5 is a flow diagram of an example process for recommending user lists.

In addition to allowing a consumer to search for user lists, user lists may be recommended to a consumer. FIG. 5 is a flow diagram of an example process 500 for recommending user lists. The process 500 may be executed, for example, by the data exchange engine 102 shown in FIG. 1A.

At stage 502, one or more criteria are evaluated to determine one or more candidate user lists for presentation to a consumer. For example, the evaluated criteria can be based on one or more terms provided by a consumer that describe an audience of interest that the consumer is attempting to target. As another example, the evaluated criteria can be based on historical use of user list data by a respective consumer, such as prior use or prior purchase of user list data.

The evaluated criteria can be based on similarities between two or more user lists. For example, the evaluated criteria can represent a condition identifying user lists similar to user lists that the consumer is subscribed to. Other examples include criteria representing conditions that identify user lists associated with consumers similar to the consumer, such as user lists similar consumers have used, have provided, have subscribed to, or have rated highly.

The evaluated criteria can be based on other data. For example, in some implementations, the evaluation criteria can be based on a consumer's vertical, on demographic information provided by the consumer, on concepts provided as part of an advertising campaign planning operation, on web site suggestions made by a consumer, or on search queries provided by a consumer.

The evaluated criteria can be based on actions taken by a user in another application. For example, a user may have used another application to search for sites based on certain criteria, such as sites related to certain demographics, sites visited by users who tend to visit a given set of sites, or sites visited by users who tend to use certain search keywords. Some or all of the criteria used by the consumer to search for sites can be received and can be used to determine one or more candidate user lists for the consumer. As another example, in some implementations, criteria used to determine one or more candidate user lists can be used by the site-search application.

At stage 504, candidate user lists are presented as a recommendation to a consumer. For example, one or more candidate user lists can be presented in a user interface. For example, candidate user lists can be presented as a recommendation on the marketplace user interface 150 shown in FIG. 1B. A recommendation 180 for a user list 182 named "International business travelers" is displayed. The recommendation 180 displays a rating for the user list 182 (e.g., four out of five stars), a subscription cost for the user list 182 (e.g., $4.75 CPM), and the provider of the user list 182 (e.g., "User5"). The recommendation 180 indicates that the user list 182 is based on a "business travelers" user list with a subscription cost of $5.15 CPM provided by "User6". The recommendation 180 includes a control 184 which can be selected to subscribe to the user list 182. A control 185 can be selected to dismiss the recommendation 180. A recommendation 186 for a user list 188 indicates that the user list 188 is not yet rated, has a subscription cost of $2.5 CPM, is provided by "User7", was added this month, and is based on the category of "travel". A control 190 can be selected to subscribe to the user list 188.

Recommendations can be presented on other types of user interfaces. For example, FIG. 6 illustrates a publisher user interface 600. The publisher user interface 600 displays, in a user list area 602, user lists that a publisher owns. A publisher can define a new user list using a control 604. A recommendations area 606 includes recommendations for user lists which are similar to the user lists presented in the user lists area 602, or which are otherwise recommended to the publisher based on other criteria.

Figure 7:
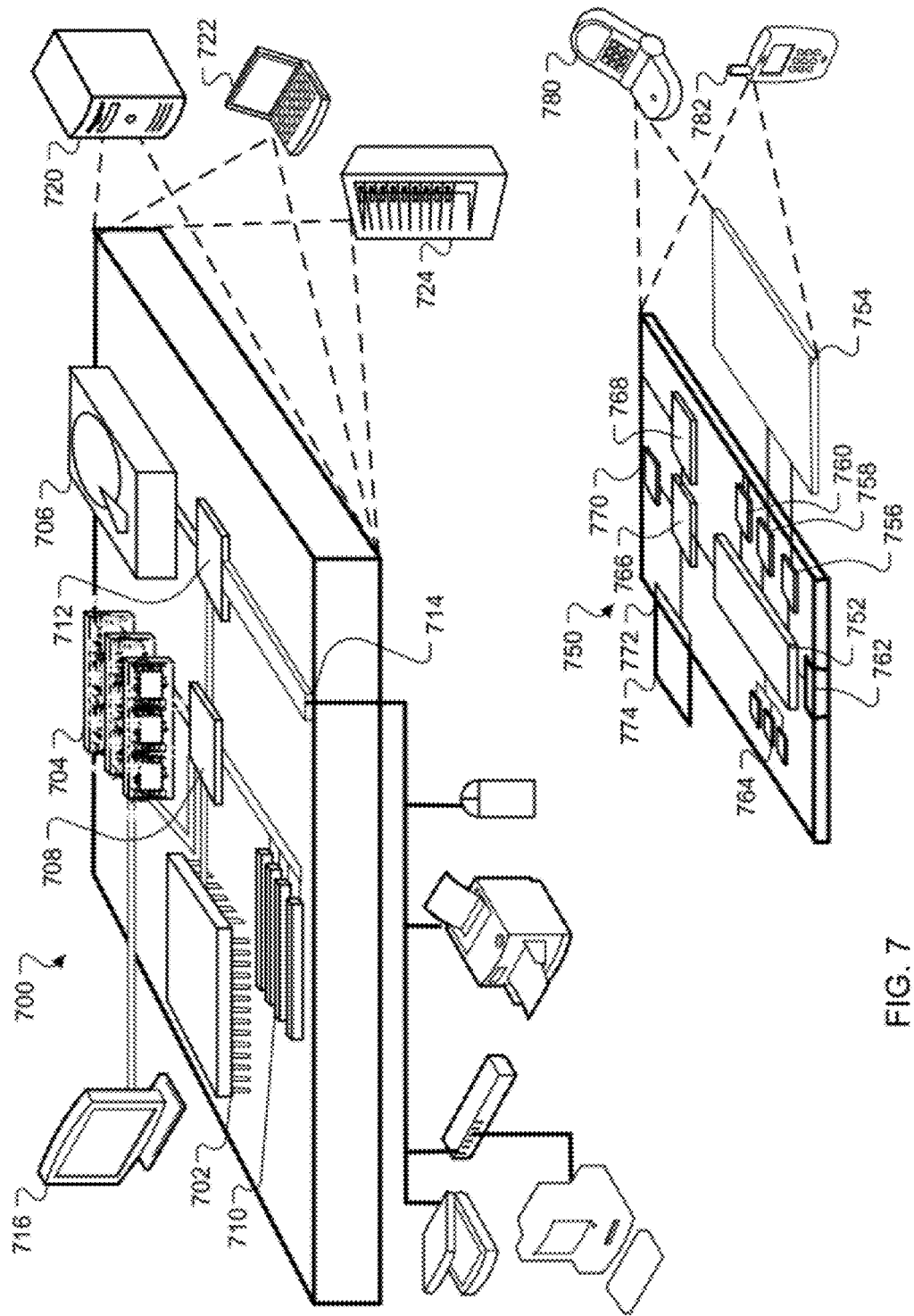
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to advertisements, but other forms of future, content delivery may also be supported.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer implemented method, comprising:
   identifying, by a data exchange engine executing on one or more processors, one or more user lists based on owned or permissioned data, each user list including a unique identifier;
   associating metadata with each user list including data describing a category for the user list, population data including recency of updates of members of the user list or subscriber reviews of the user list, and subscription data that includes subscriber cost information for subscribing to the user list including a cost for using the user list as selection criteria for a campaign and restrictions on combining user list data with other data including restrictions on using the user list data with data associated with a particular geographic region or data associated with a particular category;
   storing in a searchable database a user list identifier and the associated metadata for each list;
   publishing for potential subscribers a list of the user lists by providing an interface that includes for each user list the unique identifier and the associated metadata;
   after the publishing, receiving one or more criteria from a potential subscriber to a user list wherein the criteria includes a category, recency threshold, review threshold, cost threshold or restriction threshold;
   evaluating the received one or more criteria to determine one or more candidate user lists that satisfy the one or more criteria for presentation to the potential subscriber; and
   presenting candidate user lists as a recommendation to the potential subscriber.

2. The method of claim 1, wherein the user list includes qualification data describing qualifications for members to be included in a user list, wherein storing includes storing the qualification data and publishing includes publishing the qualification data along with the associated metadata.

3. The method of claim 2, wherein the qualification data includes a number of page views required by members to qualify for membership in a user list.

4. The method of claim 1, wherein the associated metadata includes data developed by a non-owner of a respective user list relating to cross correlations between members included in a user list.

5. The method of claim 1, wherein the associated metadata includes data developed by a non-owner of the user list data relating to inferences about members included in a user list.

6. The method of claim 5, wherein the developed data includes correlations developed from analyzing data known by the non-owner of members in a given user list.

7. The method of claim 5, wherein the developed data is demographic data.

8. The method of claim 5, wherein the developed data is inference information developed from data related to members in a given user list and that is known by the non-owner, and wherein the developed data is inferred from data selected from a group comprising similar web sites visited, videos viewed, types of searches conducted, determined related interest categories, determined geographical distribution, or calculated score for a probability to purchase goods or services.

9. The method of claim 1, wherein storing includes indexing the metadata for ease of retrieval based on received queries.

10. The method of claim 1, wherein the population data includes a popularity rating for the user list.

11. The method of claim 1, wherein the population data includes likely page views for a given member of a user list on a given slice of inventory.

12. The method of claim 1, wherein the subscription data includes best practices for use of the user list data.

13. The method of claim 1, further comprising:
    receiving a query including one or more query terms that describes an audience that a consumer is attempting to target;
    searching the database for matching user lists based on the query terms; and
    presenting matching user lists responsive to the query.

14. The method of claim 13, wherein the received query includes a user list the potential subscriber is currently subscribed to.

15. The method of claim 13, wherein the received query includes a user list, and the method includes determining user lists similar to the user list included in the received query.

16. The method of claim 13, wherein the received query includes a set of websites/pages that are of interest to the potential subscriber.

17. The method of claim 13, wherein the received query includes a set of video channels or categories that are of interest to the potential subscriber.

18. The method of claim 13, wherein the received query includes a set of keywords describing an audience the potential subscriber is seeking to target.

19. The method of claim 13, wherein the received query includes use data describing an intended use of data in a candidate user list and the method includes providing user lists that include subscription restrictions that match and allow the use.

20. The method of claim 13, wherein searching the database for matching user lists based on the query terms further comprises using past and current subscription information associated with a consumer that provided the query to filter matching user lists and provide personalized results in response to the query.

21. The method of claim 1, wherein the one or more criteria are based on terms provided by a potential subscriber that describe an audience of interest that the potential subscriber is attempting to target.

22. The method of claim 1, wherein the one or more criteria are based on historical use of user list data by a respective potential subscriber.

23. The method of claim 1, wherein the one or more criteria are based on similarities between two or more user lists.

24. The method of claim 1, wherein the recommendation is based at least in part on a potential subscriber's vertical.

25. The method of claim 1, wherein the recommendation is based at least in part on demographic information provided by the potential subscriber.

26. The method of claim 1, wherein the recommendation is based at least in part on concepts provided as part of an advertising campaign planning operation.

27. The method of claim 1, wherein the recommendation is based at least in part on web site suggestions made by a potential subscriber.

28. The method of claim 1, wherein the recommendation is based at least in part on search queries provided by a potential subscriber.

* * * * *